United States Patent [19]
Fowler et al.

[11] Patent Number: 5,465,212
[45] Date of Patent: Nov. 7, 1995

[54] HELICOPTER INTEGRATED FIRE AND FLIGHT CONTROL HAVING A PRE-LAUNCH AND POST-LAUNCH MANEUVER DIRECTOR

[75] Inventors: Donald W. Fowler, Oxford; Nicholas D. Lappos, Milford; Joan A. Edwards, Fairfield, all of Conn.

[73] Assignee: United Technologies Corporation, Hartford, Conn.

[21] Appl. No.: 173,601

[22] Filed: Dec. 23, 1993

[51] Int. Cl.⁶ .......................... B64C 11/34; B64C 11/18; B64C 11/30
[52] U.S. Cl. .................. 364/427; 364/434; 364/433; 364/565; 244/188; 244/177; 244/178
[58] Field of Search ........................... 364/427, 434, 364/433, 565, 150, 177, 423, 200, 461, 462; 244/17.13, 17.19, 188, 177, 178, 182

[56] References Cited

U.S. PATENT DOCUMENTS

| | | | |
|---|---|---|---|
| 4,010,467 | 3/1977 | Slivka | 364/434 |
| 4,924,401 | 5/1990 | Bice et al. | 364/433 |
| 5,195,700 | 3/1993 | Fogler et al. | |
| 5,263,662 | 11/1993 | Fowler et al. | 244/17.13 |
| 5,310,136 | 5/1994 | Fowler et al. | 244/17.13 |
| 5,331,881 | 7/1994 | Fowler et al. | 89/41.21 |

OTHER PUBLICATIONS

E. Rodin, D. Geist and Y. Livor, "Flight and Fire Control Knowledge Representation," Proceedings IEEE, pp. 779–780, 1989.

"Integrated Air–Air Weapon Evaluation, System Definition Report", McDonnell Douglas Helicopter Co., Sect. 6, pp. 1–31, 23 Jan. 1990.

S. Osder, "Integrated Flight/Fire Control for Attack Helicopters," IE³ AES, 1992.

McDonnel Douglas Helicopter Company, Integrated Air-to-Air Weapon (INTAAW) Evaluation System Definition Report, Final Issue, 23 Jan. 1990, pp. 6–1 to 6–31.

A Simulator Investigation of Parameters Affecting Helicopter Handling Qualities in Air Combat (HAC II), pp. 1–18, by Michael S. Lewis et al.

(List continued on next page.)

*Primary Examiner*—Kevin J. Teska
*Assistant Examiner*—Thai Q. Phau
*Attorney, Agent, or Firm*—Michael Grillo

[57] ABSTRACT

An integrated fire and flight control (IFFC) system determines a ballistic firing solution based on the position of targets relative to a helicopter and also based on the type of weapons to be fired. An elevation command is determined based on the required change in helicopter attitude to achieve the ballistic firing solution that, combined with the estimated time required to perform the aim and release of weapons, provides an estimate of deceleration and velocity loss that will occur. A forward acceleration and velocity profile is determined based on the desire to make a symmetrical maneuver sequence involving a nose down acceleration to achieve the acceleration and velocity profile that will be canceled by the subsequent deceleration and velocity loss during the pitch up maneuver to the ballistic firing solution. The forward acceleration and velocity profile is used to provide a pilot with a forward acceleration command that directs the pilot to fly a nose down attitude until the required forward acceleration and velocity profile is achieved. Alternatively, the acceleration profile is coupled to a flight control wherein a pre-launch maneuver feedforward command signal is summed with a side arm controller control command signal as the primary input to a rotor mixing function and a pre-launch commanded rate signal is summed with a side arm controller commanded rate signal to provide the primary input to an automatic flight control system, to thereby automatically control the aircraft to assume an attitude necessary to achieve the desired forward acceleration and velocity profile. A terminal phase maneuver is calculated to thereby return the aircraft to the previous attitude, velocity hold, hover hold or position hold condition prior to commencement of the pre-launch maneuver.

9 Claims, 8 Drawing Sheets

OTHER PUBLICATIONS

IFEE AES Systems Magazine, Jan. 1992, Integrated Flight/Fire Control for Attack Helicopters, pp. 17–23, by Stephen Osder of McDonnel Douglas Helicopter Co.

Chief Engineer, vol. 6, No. 4, Jul.–Aug. 1983, Design and Analysis of a Digitally Controlled Integrated Flight/Fire Control System pp. 251–257 by John H. Blakelock, Applications Research Corp.

IEEE AES Aerospace and Electronics Systems Magazine, IEEE, vol. 7, No. 1, Jan. 1992, New York, N.Y. USA.

HELICOPTER INTEGRATED FIRE AND FLIGHT CONTROL HAVING A PRE-LAUNCH AND POST-LAUNCH MANEUVER DIRECTOR

The Government has rights in this invention pursuant to Contract No. DAAJ02-91-C-0041 awarded by the Department of the Army.

TECHNICAL FIELD

The present invention relates to flight control systems for rotary wing aircraft, and more particularly to an integrated fire and flight control system which automatically performs a pre-launch maneuver or directs a pilot to perform a pre-launch maneuver to compensate for the effects of a subsequent pitch up maneuver to an aiming attitude corresponding to a ballistic solution, such that the deceleration during the pitch up maneuver returns the aircraft to the approximate attitude, velocity hold, hover hold, or position hold condition prior to the pre-launch maneuver.

BACKGROUND OF THE INVENTION

The combat uses for helicopter aircraft have changed dramatically over the years to include contact with opposing forces, including reconnaissance and combat aircraft assistance of troops on the front line. This type of use subjects helicopters to numerous threats, and therefore new helicopter designs incorporate offenses weapons, such as gatling guns and rocket launchers.

Initially, the primary control of helicopter weapons was accomplished by the pilot adjusting the aircraft attitude prior to firing. Correction for misses was accomplished by the pilot adjusting the attitude of the aircraft prior to expending additional ordinance. As technology developed, tracking and sensing systems were used to locate a target or target area and determine the aircraft attitude necessary to aim the weapon so as to account for outside forces acting on the ordinance, e.g., wind, aircraft speed, etc. Such a system typically displays a "cross hair" indicative of the actual aircraft attitude and a geometric shape indicative of the required aircraft attitude to provide a high probability of striking the target with the weapon. The pilot is required to maneuver the aircraft so as to place the cross hair in the firing solution defined by the shape prior to firing the weapon. The aiming instructions, e.g., cross hair and geometric shape, are typically displayed on a control panel, a heads up display, or helmet mounted display which provides the pilot with the visual information relating to the target position, aircraft attitude, heading, speed, and altitude.

To further improve weapons delivery accuracy, a system has been developed which simultaneously controls aircraft yaw attitude, pitch attitude, and the firing of aircraft mounted weapons to thereby coordinate the accurate delivery of ordinance at specific target coordinate within a selected target area. Such a system is described and claimed in commonly owned, co-pending U.S. patent application Ser. No. 07/967,308, entitled "Helicopter Integrated Fire and Flight Control Having Coordinated Area Bombing Control". This system provides azimuth and elevation error signals which replace the aircraft yaw attitude feedback error and pitch attitude feedback error for controlling the aircraft to assume an attitude based on a firing solution. Once the aircraft has attained a proper firing attitude, a firing signal is provided for weapons release. The aircraft then assumes the firing attitude corresponding to the next target location.

When the pilot controls the aircraft attitude for a ballistic firing solution, or if an integrated fire and flight control system automatically controls the aircraft attitude for a ballistic firing solution, the aircraft assumes a rearward acceleration because of the upward pitch angle. For certain weapons, e.g., a 70 mm (2.75 inch) rocket with fixed pods, the aircraft may be required to achieve up to a 21° nose-up attitude prior to weapons release. Because of the large rearward acceleration which is attained when assuming the large nose-up attitude, the pilot typically performs a pre-launch forward acceleration maneuver. The pilot uses best pilot judgment and careful attention to ground and obstruction clearance when making the maneuver. In reduced visual conditions, the maneuver is quite hazardous, and pilots often increase altitude as a result. The increase in altitude reduces the terrain masking of helicopter position and may contribute to reduced survivability.

DISCLOSURE OF THE INVENTION

Objects of the invention include provision of an improved flight control system for a rotary wing aircraft, which is integrated with an aircraft fire control system for controlling aircraft pitch attitude to achieve an aircraft forward velocity required to compensate for aircraft rearward acceleration during a pre-planned pitch up maneuver to a firing attitude which corresponds to a ballistic solution.

A further object of the present invention is to provide an integrated fire and flight control system which directs a pilot to perform a maneuver to achieve a forward velocity required to compensate for a pitch-up aiming maneuver.

A still further object of the present invention is to provide an integrated fire and flight control system which automatically performs a maneuver to achieve a forward velocity required to compensate for a pitch up aiming maneuver and which maintains pilot command authority to override the fire control solution effects on aircraft pitch attitude.

Another object of the present invention is to provide an integrated fire and flight control system which automatically compensates for the change in helicopter position caused by a pitch up aiming maneuver and which thereafter returns the helicopter to its trim condition prior to the maneuver.

According to the present invention, a ballistic firing solution is determined based on the position of targets relative to a helicopter and also based on the type of weapons to be fired; an elevation command is determined based on the required change in helicopter trim attitude to achieve the ballistic firing solution that, combined with the estimated time required to perform the aim and release of weapons, provides an estimate of deceleration and velocity loss that will occur. A forward acceleration and velocity profile is determined based on the desire to make a symmetrical maneuver sequence involving a nose down acceleration to achieve the acceleration and velocity profile that will be canceled by the subsequent deceleration and velocity loss during the pitch up maneuver to the ballistic firing solution. The forward acceleration and velocity profile is used to provide a pilot with a forward acceleration command that directs the pilot to fly a nose down attitude until the required forward acceleration and velocity profile is achieved.

In further accord with the present invention, the forward acceleration and velocity profile is coupled to a flight control wherein a pre-launch maneuver feedforward command signal is summed with a side arm controller control command signal as the primary input to a rotor mixing function and a pre-launch commanded rate signal is summed with a side arm controller commanded rate signal to provide the primary input to an automatic flight control system, to thereby automatically control the aircraft to assume an attitude necessary to achieve the desired forward acceleration and velocity profile.

In still further accord with the present invention, a terminal phase maneuver is calculated to thereby return the aircraft to the previous attitude, velocity hold, hover hold or position hold condition prior to commencement of the pre-launch maneuver.

The present invention reduces pilot work load during a weapons launch and improves overall weapons effectiveness since the fire control system is used to determine a pre-launch maneuver which compensates for the rearward acceleration during a subsequent pitch-up to an aiming attitude and release of stores. The invention replaces the pilot's guess work in estimating the pre-launch maneuver required to launch rockets from fixed elevational pods. In some cases, even with articulated pods, a pitch up may be needed to give the required elevation angle and clearance. The present invention improves the safety involved in a ballistic weapon launch because rearward acceleration into uncleared areas is limited by the pre-launch maneuver. Therefore, the present invention reduces the space required to perform the launch, reduces the time it takes to perform the launch maneuver, and when integrated with a coupled aiming feature, increases launch accuracy. By reducing the work load on the pilot, by not requiring him to determine the necessary pre-launch maneuver, the pilot is able to concentrate on the tactical environment and safety considerations.

The foregoing and other objects, features and advantages of the present invention will become more apparent in light of the following detailed description of the exemplary embodiments thereof, as illustrated in the accompanying drawings.

BEST MODE FOR CARRYING OUT THE INVENTION

The integrated fire and flight control (IFFC) system of the present invention is particularly well suited for aiding a helicopter pilot in the target acquisition phase of the mission, and for improving weapons effectiveness by increasing ordnance delivery accuracy. Additionally, the IFFC system provides a pre-launch maneuver director which controls aircraft pitch attitude to achieve an aircraft forward acceleration and velocity required to compensate for aircraft rearward acceleration during a pre-planned pitch up maneuver to a firing attitude corresponding to a ballistic solution. At the completion of the weapons launch, a post-launch maneuver is performed to return the aircraft to the approximate attitude, velocity hold, hover hold, or position hold condition prior to activation of the IFFC system.

Figure 1:
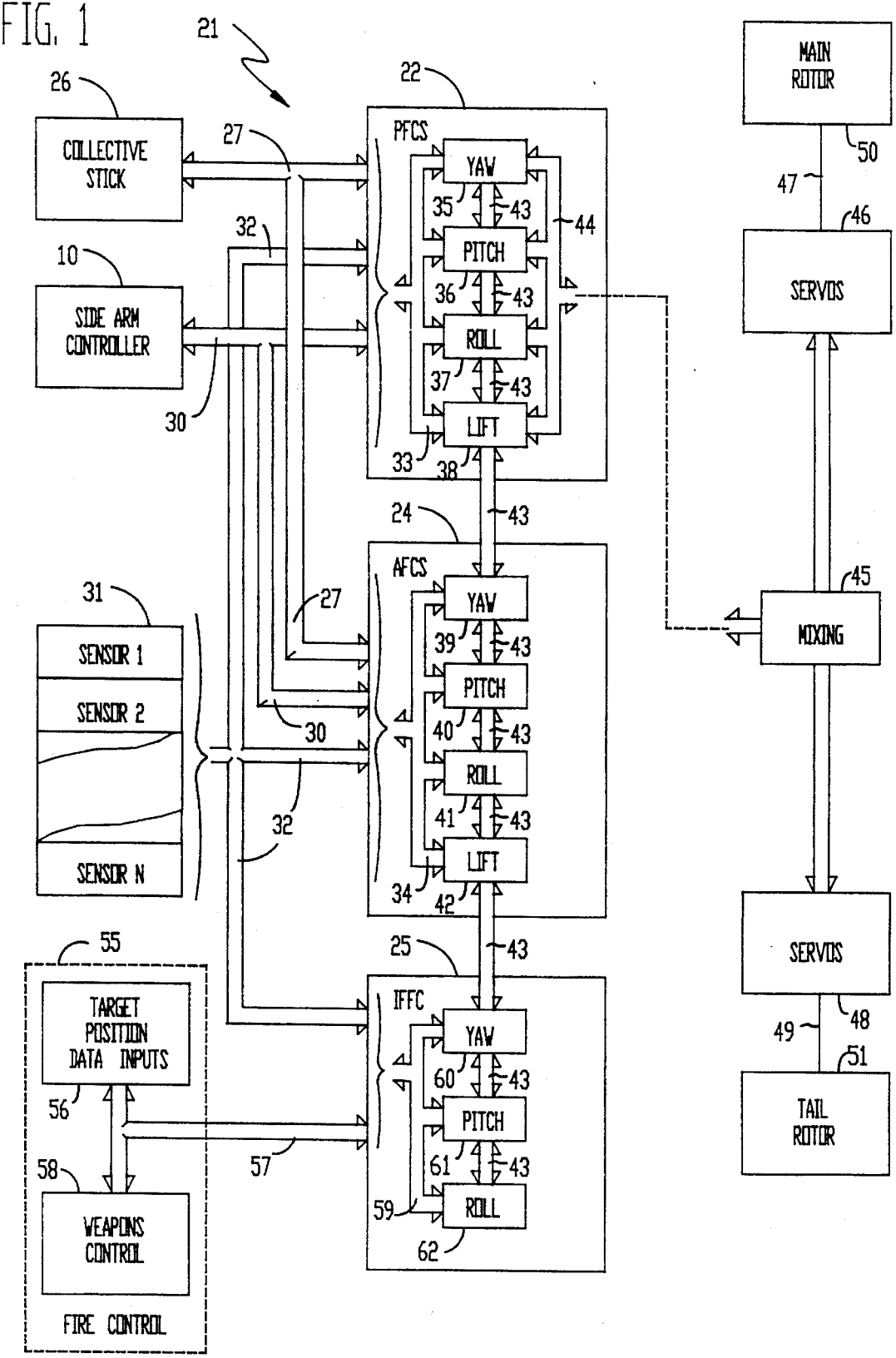
FIG. 1 is a block diagram of an integrated fire and flight control system of the present invention.

Referring now to FIG. 1, the system of the present invention 21 includes a primary flight control system (PFCS) 22, an automatic flight control system (AFCS) 24 and an integrated fire and flight control system (IFFC) 25. The PFCS receives displacement command output signals from a displacement collective stick 26 on lines 27. The AFCS also receives collective stick discrete output signals on the lines 27. The PFCS and AFCS each receive the force output command signals of a four-axis sidearm controller 29 on lines 30. The AFCS and PFCS also receive sensed parameter signals from sensors 31 on lines 32. The pilot command signals on lines 27 and 30 and the sensed parameter signals on lines 32 are shown consolidated within trunk lines 33 and 34 in the PFCS and AFCS, respectively.

The PFCS and AFCS each contain control modules for controlling the yaw, pitch, roll and lift axes of the aircraft. These modules are shown by blocks 35–38 for the PFCS and blocks 39–42 for the AFCS. The PFCS modules provide rotor command signals, and the AFCS modules provide conditioning and/or trimming of the PFCS rotor command signals. The PFCS and AFCS modules are interconnected through bus 43.

The PFCS and AFCS use a model following algorithm in each control axis to provide rotor command signals on output lines 44 to a rotor mixing function 45 which commands displacement of mechanical servos 46 and linkages 47 to control the tip path plane of a main rotor 50. Additionally, the rotor mixing function 45 controls tail rotor servos 48 which control the thrust of a tail rotor 51 through linkages 49. The sensed parameter signals from sensors 31, on lines 32, provide the PFCS and AFCS with the aircraft's angular rate and attitude response to the o main rotor and tail rotor command signals. Additionally, the sensors provide information related to velocity, altitude, acceleration, etc., which information may or may not be used by the flight control system.

The IFFC 25 receives fire control data from a fire control system 55 on lines 57. The IFFC also receives sensed parameter signals on lines 32 from sensors 31. Target position data is provided to the fire control 55 from target position/angle data inputs 56. The target position/angle data may be provided from a variety of sources as is well-known in the art, e.g., line of sight angle sensors, map and position data, infrared sensors, laser sensors, radar sensors, etc. Weapons control data is also provided from a weapons control portion 58 of the fire control system 55. The fire control data on lines 57 and sensed parameter signals on lines 32 are shown consolidated within trunk lines 59 in the IFFC.

The IFFC contains control channel modules for providing yaw, pitch and roll control signals to the AFCS. These modules are shown by blocks 60, 61 and 62, respectively. The IFFC modules are interconnected to the PFCS and AFCS modules through the bus 43. As described in greater detail hereinafter, during automatic pre-launch maneuver control, weapons launch or coordinated area bombing, and subsequent post-launch maneuver control, the IFFC provides an IFFC feedforward command and an IFFC commanded rate signal to modify PFCS and AFCS commands, respectively. Normally, in response to pilot commands from the sidearm controller 29, the PFCS provides control command signals to the rotor mixing function indicative of the approximate rotor command necessary to achieve the desired attitude rate of change. Additionally, the AFCS provides the desired yaw and pitch attitude reference. The difference between the attitude reference commands and actual aircraft attitude are attitude feedback error signals which the AFCS continuously attempts to reduce to zero. The AFCS attitude reference commands change in response to a commanded attitude rate signal provided by the pilot's sidearm controller 29. The attitude rate signals are indicative of the desired rate of change of aircraft attitude. When certain weapons are selected, e.g., a rocket having a fixed pod, and IFFC is enabled, then an IFFC feedforward command is added to the control command signal and an IFFC commanded rate signal is added to the commanded attitude rate signal. This is referred to as the "coupled aiming" mode or the "coordinate area bombing" mode of operation. IFFC may be enabled by the pilot depressing a switch on the sidearm controller 29, or other logic may be provided as described in greater detail in commonly owned, U.S. patent application Ser. No. 07/967,308 entitled "Helicopter Integrated Fire and Flight Control Having Coordinated Area Bombing Control", the disclosure of which is incorporated herein by reference.

Figure 2:
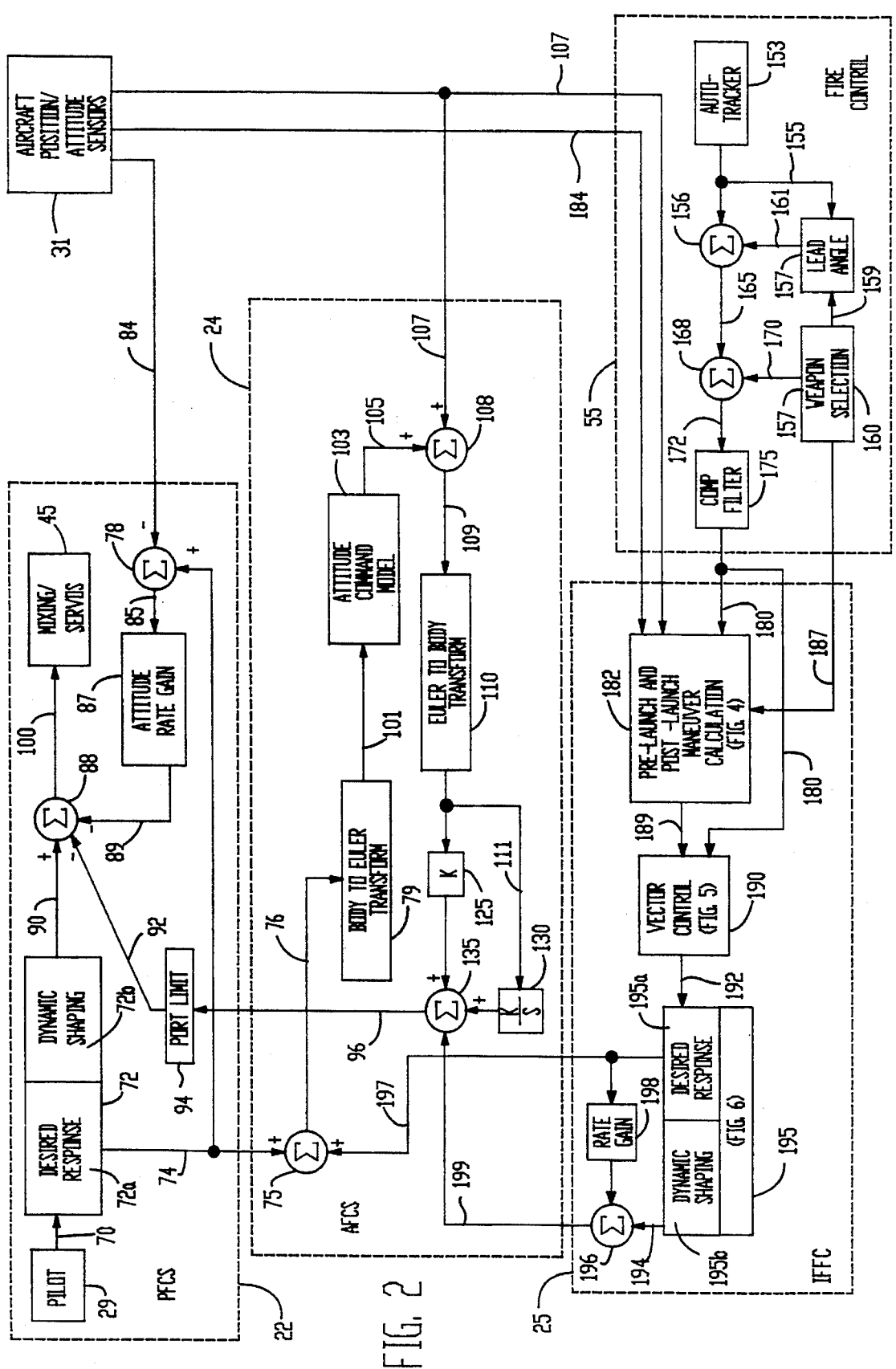
FIG. 2 is a simplified schematic block diagram of the integrated fire and flight control system of FIG. 1.

FIG. 2 illustrates the functional interconnection of the IFFC 25 with the PFCS 22 and the AFCS 24. FIG. 2 will be described with respect to the pitch axis modules 36, 40, 61, e.g., flight control pitch attitude reference and fire control elevation command signals; however, it will be understood by those skilled in the art that the functional interconnection of FIG. 2 is equally applicable to flight control yaw attitude reference and fire control azimuth command signals.

The PFCS receives a pitch axis command signal on line 70, provided through trunk lines 33 and lines 30, from the sidearm controller 29 (FIG. 1). In the present embodiment, the sidearm controller is a four-axis force stick in which yaw axis command signals are generated by the pilot's lateral twisting (left or right) of the sidearm controller, and in which pitch axis command signals are generated by the pilot's pushing and pulling (front or back) of the sidearm controller. The pitch command signal is presented to the input of signal shaping circuitry 72. The signal shaping circuitry comprises a desired rate response section 72a that provides a commanded pitch rate signal on a line 74 indicative of the desired rate of change of the aircraft attitude about the pitch axis. Additionally, the signal shaping circuitry 72 comprises a dynamic shaping section 72b which is an inverse model of the approximate plant pitch axis response that provides a control command signal on a line 90. The control command signal on the line 90 represents the approximate rotor command necessary to achieve the desired pitch axis rate of change of the aircraft for each pilot commanded maneuver, and provides the primary control input to the rotor mixing function 45.

The commanded pitch rate signal on the line 74 is provided to a summing junction 78 in the PFCS, and a Body to Euler Transformation 79 in the AFCS via a summing junction 75. The summing junction 78 sums the commanded pitch rate signal on line 74 with the aircraft's actual pitch rate, received (from sensors 31, through lines 32 and trunk 33) as a sensed pitch rate signal on line 84. The output of the summing junction 78 is a pitch rate error signal on a line 85.

The rate error signal is amplified in a rate gain stage 87 and is provided on a line 89 to one input of a third PFCS summing junction 88. The summing junction 88 also receives the control command signal on line 90 from the signal shaping circuitry 72b, and a pitch command modifying signal on a line 92 from a rate and magnitude limiter 94. The limiter 94, which receives a nonlimited version of the pitch command modifying signal on a line 96 (through bus 43) from the AFCS, limits the pitch command modifying signal if its magnitude and rate of change limits are exceeded. The output of the summing junction 88 is provided on a line 100, and presented through the PFCS output trunk lines 44 to the mixing function 45.

The magnitude and rate of change of the pitch command modifying signal from the AFCS is a function of the aircraft pitch error. The pitch command modifying signal provides an aircraft attitude feedback loop around the rotor command signal. The attitude feedback loop is the second of two feedback loops around the rotor command signal; the first being a pitch rate feedback loop provided by the pitch rate error signal on line 89.

The pitch command modifying signal is a calculated value provided by a model following algorithm within the AFCS, based on the actual aircraft response to the rotor command signal. The pitch command modifying signal modifies the rotor command signal to achieve the pilot commanded pitch attitude. A more detailed description of the model following algorithms of the AFCS, and AFCS architecture, is given in commonly owned U.S. Pat. No. 5,238,203, entitled "High Speed Turn Coordination For A Rotary Wing Aircraft", the disclosure of which is incorporated herein by reference.

A pitch attitude feedback error signal is used to provide the pitch is command modifying signal. The attitude feedback error signal is developed in the AFCS. The commanded pitch rate signal is provided on a line 76 (via line 74 and summing junction 75) to the Body to Euler Transformation 79. The Transformation 79 transforms the pitch rate signal, which is in terms of aircraft body axes, to an inertial axes reference. The output of the transformation 79 is provided on a line 101 to an AFCS attitude command model 103. The attitude command model 103 is an integral function which converts the commanded pitch rate signal to a commanded pitch attitude signal on a line 105. The commanded pitch attitude signal is provided to a summing junction 108, the other input of which is a pitch attitude signal on a line 107, provided from sensors 31, through lines 32 and trunk 34 (FIG. 1). The output of the summing junction 108 is a pitch attitude feedback error signal on a line 109 in terms of inertial axes, and is the difference between the commanded pitch attitude on the line 105 and the actual aircraft pitch attitude on the line 107. The pitch attitude feedback error signal is provided to a Euler to Body Transform 110 which transforms the pitch attitude feedback error signal from an inertial axes reference back to an aircraft body axes reference on a line 111. The operation of both Transform functions 79, 110 are described in greater detail in the aforementioned commonly owned U.S. Pat. No. 5,238,203, the disclosure of which is incorporated herein by reference.

The pitch attitude feedback error signal on the line 111 is applied via a proportional path containing a gain function 125 to a summing junction 135. The pitch attitude feedback signal is also applied to the summing junction 135 via an integral path containing an integral function 130. The output of the summing junction 135 is the pitch command modifying signal on the line 96.

The IFFC feedforward elevation command signal and the

IFFC commanded elevation rate signal are provided by the IFFC 25 in response to target information provided by the fire control system 55. Normally, when a specific threat/ enemy platform is selected as the target for use in the coupled aiming mode, target azimuth and elevation information is provide on a line 155 by a target autotracker 153, e.g., an electro-optical tracking device or a radar. The azimuth and elevation information provided by the autotracker 153 is a line of sight vector between the target and an arbitrary point on the aircraft body used for line of sight calculations, e.g., an aircraft reference axis. The line of sight vector is resolved into an elevation component and an azimuth component. The output of the autotracker function 153 is provided on the line 155 to a summing junction 156 and to a lead angle calculation function 157. The other input to the lead angle calculation function 157 is a weapons type signal on a line 159 from a weapons selection function 160. The lead angle calculation function uses the weapons type information and the autotracker information to calculate the amount of weapons offset, i.e., lead angle, to impact a target having a track and velocity corresponding to the target track and position information provided from the autotracker function. The lead angle is provided on a line 161 to the summing junction 156 where it is added to the target line of sight vector to provide a corrected elevation command on a line 165.

The corrected elevation command on the line 165 is applied to a summing junction 168. The other input to the summing junction 168 is a bore sight correction signal on a line 170 from the weapons selection function 160. The bore sight correction signal is indicative of the offset between the selected weapon and the aircraft reference axis. The output of the summing junction 168 is an elevation command which is the elevation component of an aiming line of sight vector. The aiming line of sight vector is indicative of the weapon launch angle change needed so that the weapon trajectory as determined by the fire control will result in the weapon to successfully impacting the target. The elevation command is applied on a line 172 to a complementary filter function 175. The complementary filter may be of any suitable type known in the art for allowing aircraft body rate frequency band width to remain high while lowering aircraft body rate response to noise from the fire control path. The output of the complementary filter is an IFFC elevation error signal on a line 180.

Figure 3:
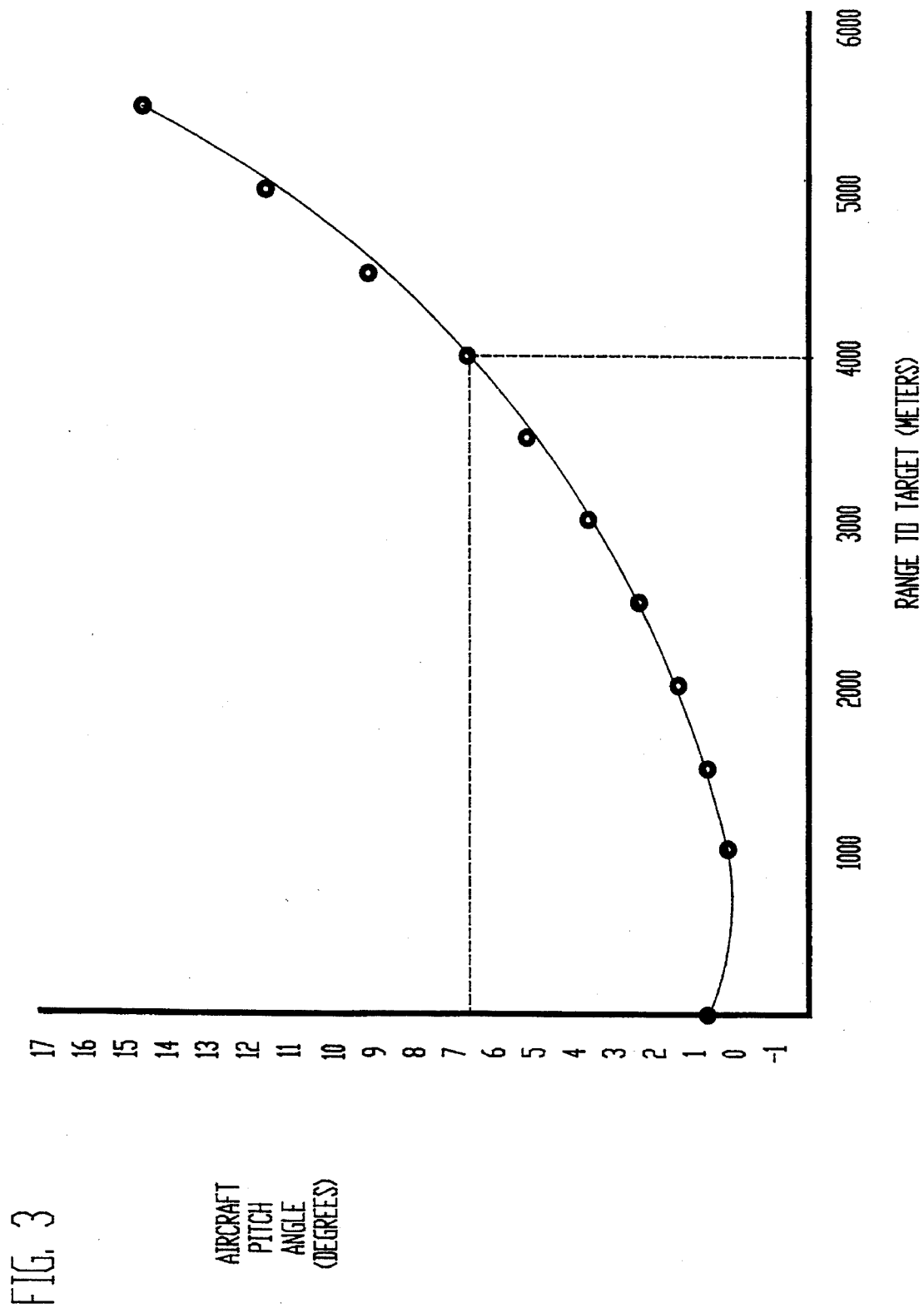
FIG. 3 is a graph showing the relationship between aircraft pitch angle and ordinance range for a mark 40, 70 mm (2.75 inch) folding fin aerial rocket having a 4.5 kg (10 lb) warhead.

The IFFC elevation error signal represents the required change in aircraft pitch attitude prior to a weapons launch for the selected weapon to strike the target. Referring to FIG. 3, a launch table shows the relationship between aircraft pitch angle and ordnance delivery range for a Mark 40, 70 mm (2.75 inch), folding fin aerial rocket having a 4.5 kg (10 lb) warhead. For example, the pilot is required is achieve a 6.5 degree pitch angle to deliver the ordnance at a range of 4,000 meters. This graph assumes that the aircraft and the target are at the same altitude. Further adjustments are required if the target is at a different altitude from the aircraft. Additional adjustments must be made if the weapon pod is As illustrated in FIG. 3, the aircraft must assume a "pitch-up" attitude to deliver a ballistic weapon at long ranges, e.g., ranges greater than about 1,500 meters. During such a pitch-up maneuver, the aircraft will experience a deceleration if it is in a forward velocity state prior to the pitch-up maneuver, or it may actually begin to accelerate in a rearward direction if it assumed the pitch-up attitude from a hover or a near hover condition. The degree of deceleration or rearward acceleration is dependent upon the duration and magnitude of the pitch-up maneuver. If for example the aircraft is involved in the coordinated bombing of a remote target area wherein numerous ballistic weapons are delivered at specific coordinates within a distant target area, the aircraft may achieve a large rearward acceleration and velocity during the pitch-up maneuver.

Referring again to FIG. 2, a pre-launch and post-launch maneuver calculation function 182 is responsive to the IFFC elevation error signal on the line 180, the pitch attitude signal on the line 107, an aircraft velocity signal on a line 184, and a weapons signal on a line 187 for determining an aircraft forward acceleration and velocity profile required to compensate for the deceleration effects of a pitch-up maneuver to an aiming attitude. Additionally, the calculation function 182 will determine a post-launch recovery maneuver based on the condition of the aircraft prior to the pre-launch and pitch-up maneuvers. The weapons signal on the line 187 is provided by the weapons selection function 160 and is indicative of the number and type of weapons to be fired so that the time to fire the weapons can be estimated by the calculation function 182 for purposes of determining the pre-launch maneuver. The calculation function 182 will be described in greater detail hereinafter with respect to FIG. 4.

The output of the calculation function 182 is either a pre-launch or a post-launch pitch attitude error signal indicative of the change in pitch attitude required for the aircraft to perform a pre-launch or post-launch maneuver, respectively. The pre-launch and post-launch (collectively launch) pitch attitude error signals are provided on a line 189 to a vector control function 190 which provides a pitch rate command signal the magnitude of which is equal to the ratio of the launch pitch attitude error signal to a launch vector during operation in either a pre-launch, aiming, or post-launch phase of the coupled aiming mode. The launch vector is the vector defined by the launch pitch and yaw attitude error signals. The purpose of the vector control function is to modify the authority of the launch pitch and yaw attitude error signals such that the change in aircraft attitude corresponding to the launch pitch and yaw attitude error signals is accomplished over the same time period. During the weapons firing phase of the maneuver, the magnitude of the pitch rate command signal is equal to the ratio of the IFFC elevation error signal to an IFFC error signal vector. The IFFC error signal vector is the vector defined by the IFFC elevation and azimuth error signals. The operation of the vector control function 190 is described in greater detail hereinafter with respect to FIG. 5.

The pitch rate command signal is provided on a line 192 to signal shaping circuitry 195. The signal shaping circuitry comprises a desired rate response section 195a that provides the IFFC commanded elevation rate signal on a line 197 to the summing junction 75. The IFFC commanded elevation rate signal is indicative of the desired rate of change of the aircraft attitude about the pitch axis for performing the pre-launch, aiming and post-launch maneuvers. The IFFC commanded elevation rate signal is summed with the AFCS commanded pitch rate signal by summing junction 75. The signal shaping circuitry 195 also comprises a dynamic shaping section 195b for providing the IFFC feedforward elevation command signal on a line 199 to the summing junction 135 (via line 194 and a summing junction 196). The other input to the summing junction 196 is a rate canceling signal which is determined by applying the IFFC commanded elevation rate signal on the line 197 to a pitch rate feedback gain function 198. The IFFC feedforward elevation command signal represents the approximate rotor command necessary to achieve the desired pitch axis rate of change of the aircraft corresponding to the pre-launch, aiming and post-launch maneuvers. The IFFC feedforward elevation command signal is provided via the summing junction 135, line 96, port limit 94, and line 92 to the summing junction 88 where it is summed with the PFCS command control signal on the line 90. The signal shaping circuitry 195 converts the pitch vector error signal into signals compatible with the signals provided by the PFCS, and its operation will be described in greater detail with respect to FIG. 6.

The pre-launch and post-launch maneuver control of the present invention is particularly well suited for use in conjunction with the firing of ballistic weapons because of the pitch-up maneuver required to satisfy a ballistic weapon firing solution. The use of an IFFC system for the coordinated firing of ballistic weapons is described in greater detail in commonly owned co-pending U.S. patent application Ser. No. 07/967,308 entitled "Helicopter Integrated Fire and Flight Control Having Coordinated Area Bombing Control", the disclosure of which is incorporated herein by reference. For entry into the coordinated area bombing mode (coupled aiming mode) of IFFC operation, various requirement must be satisfied, e.g., selection of IFFC mode by the pilot and activation of an IFFC enable switch on a pilot side-arm controller. To provide a pre-launch and post-launch maneuver as part of a coordinated area bombing sequence, the pilot must select these modes of operation prior to activation of the IFFC.

During a coordinated area bombing sequence involving a pre-launch and post-launch maneuver, the sequence is performed in four phases, a pre-launch maneuver phase, a pitch-up maneuver phase, an aiming and weapons-launch maneuver phase, and a post-launch recovery maneuver phase. Each one of the maneuver phases will be described separately hereinafter.

I. PRE-LAUNCH MANEUVER PHASE

Figure 4:
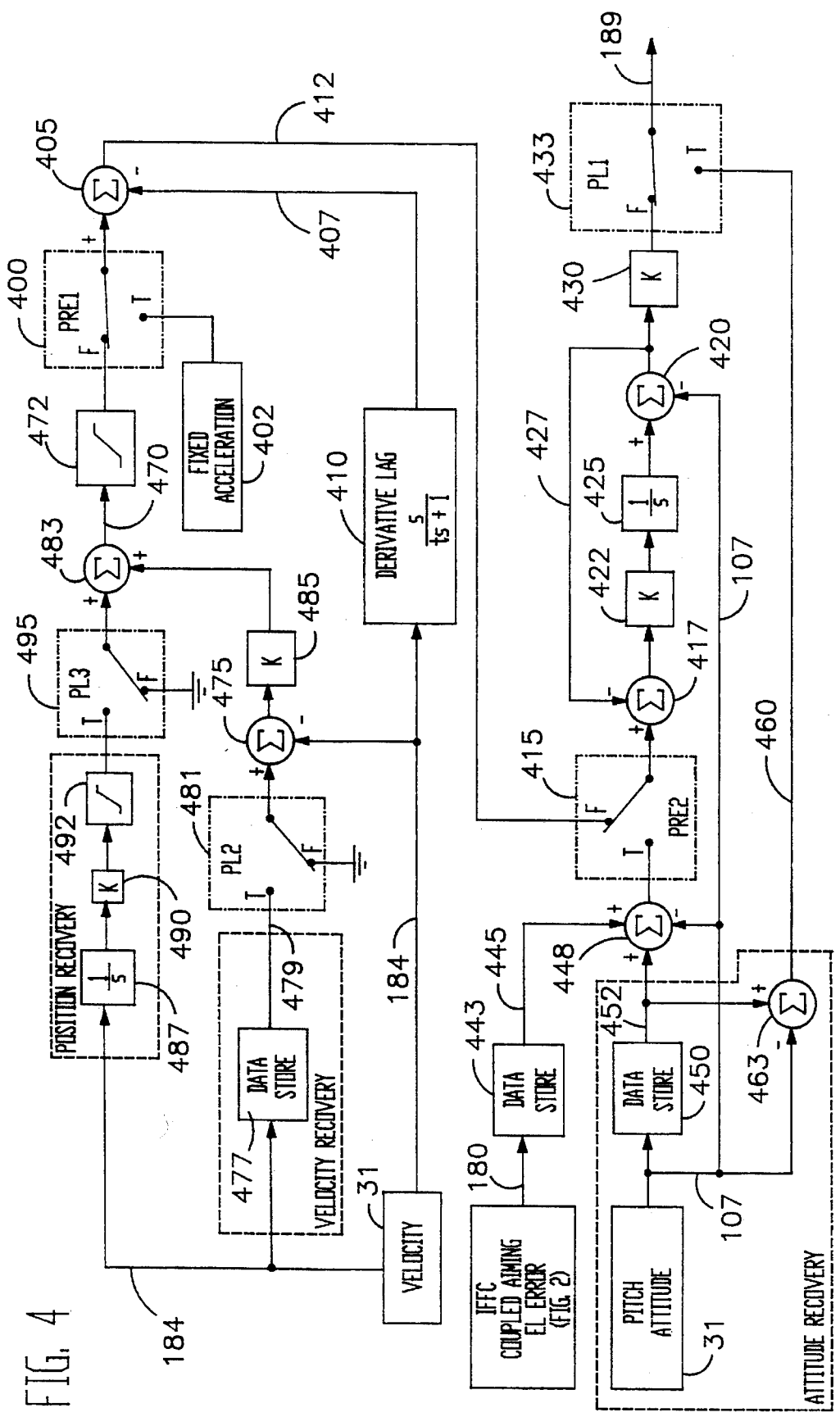
FIG. 4 is a schematic block diagram of a pre-launch and post-launch maneuver control portion of the integrated fire and flight control system of FIG. 2.
Figure 7:
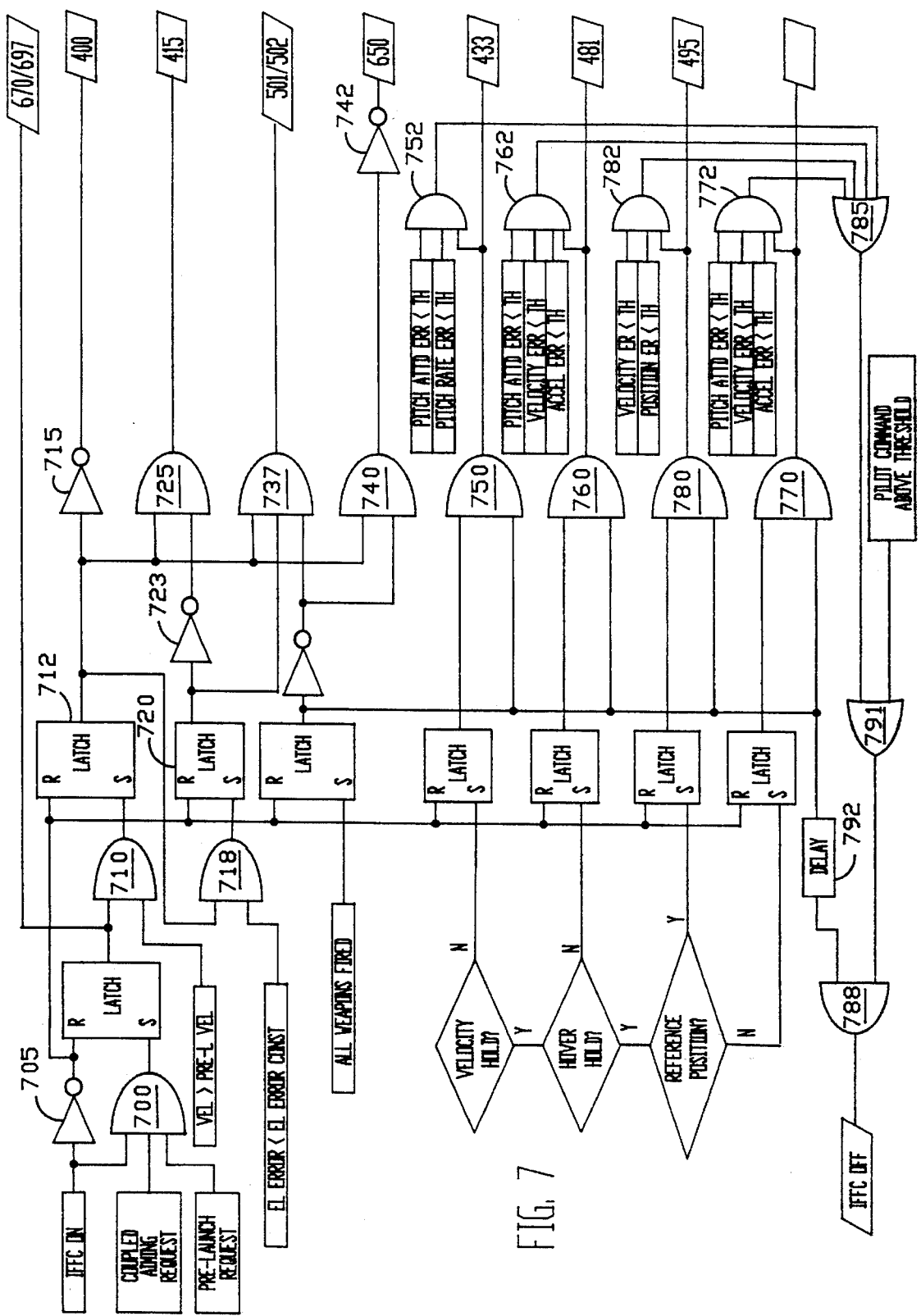
FIG. 7 is a logic flow diagram of the logic for controlling the operation of the integrated fire and flight control system of FIGS. 4–6.

The pre-launch and post-launch maneuver calculation is performed using the diagram of FIG. 4; however, FIG. 4 will initially be described with respect to the pre-launch maneuver calculation. Referring to FIG. 4, switch symbols are illustrated to show that two different signal sources may provide an input signal on various signal paths. The normal position of a switch is indicated by the F or false symbol, and when a switch is activated, it is activated to the T or true position. The logic for controlling the position of the various switches is illustrated in FIG. 7, and will be described in greater detail hereinafter.

When a pre-launch maneuver sequence is activated, a first pre-launch switch (Pre 1) 400 is activated to thereby provide an acceleration signal to a summing junction 405. The acceleration signal is a fixed acceleration, e.g., 1.5 meters per second (5 feet per second), provided by a fixed acceleration function 402. The other input to the summing junction 405 is an actual acceleration signal on a line 407. The actual acceleration signal is determined by applying the velocity signal on the line 184 (from a velocity sensor 31) to a derivative lag filter 410. Alternatively, a forward acceleration sensor may be used to provide the actual acceleration signal. In either case, it may be desirable to provide s the acceleration signal via a filter. The output of the derivative lag filter 410 is the actual acceleration signal on the line 407. The output of the summing junction 405 is a pre-launch acceleration error signal on a line 412 which is the difference between actual aircraft acceleration and the fixed acceleration signal. The pre-launch acceleration error signal is applied to a summing junction 417 via a second pre-launch switch (Pre 2) 415. Pre 2 will remain deactivated during the initial acceleration of the aircraft to the pre-launch acceleration and velocity profile, and will thereafter become activated when the aircraft achieves the desired acceleration profile, as described in greater detail with respect to FIG. 7.

The output of the summing junction 417 is applied to a second summing junction 420 via a scaling factor 422 and an integral function 425. The scaling factor and integral function, along with output feedback on a line 427 which introduces a lag into the signal path, convert the pre-launch acceleration error signal into an attitude signal indicative of an aircraft attitude necessary to achieve the pre-launch acceleration profile. The other input to the summing junction 420 is the pitch attitude signal on the line 107 (from sensors 31). The output of the summing junction 420 is a pre-launch pitch attitude error signal and is indicative of the change in aircraft pitch attitude necessary to achieve the acceleration profile. The pre-launch pitch attitude error signal is provided in the feedback path 427 to the summing junction 417. The pre-launch pitch attitude error signal is also provided via a gain function 430 and a first post-launch switch 433, on the line 189, to the vector control function 190 (FIGS. 2 and 5).

Figure 5:
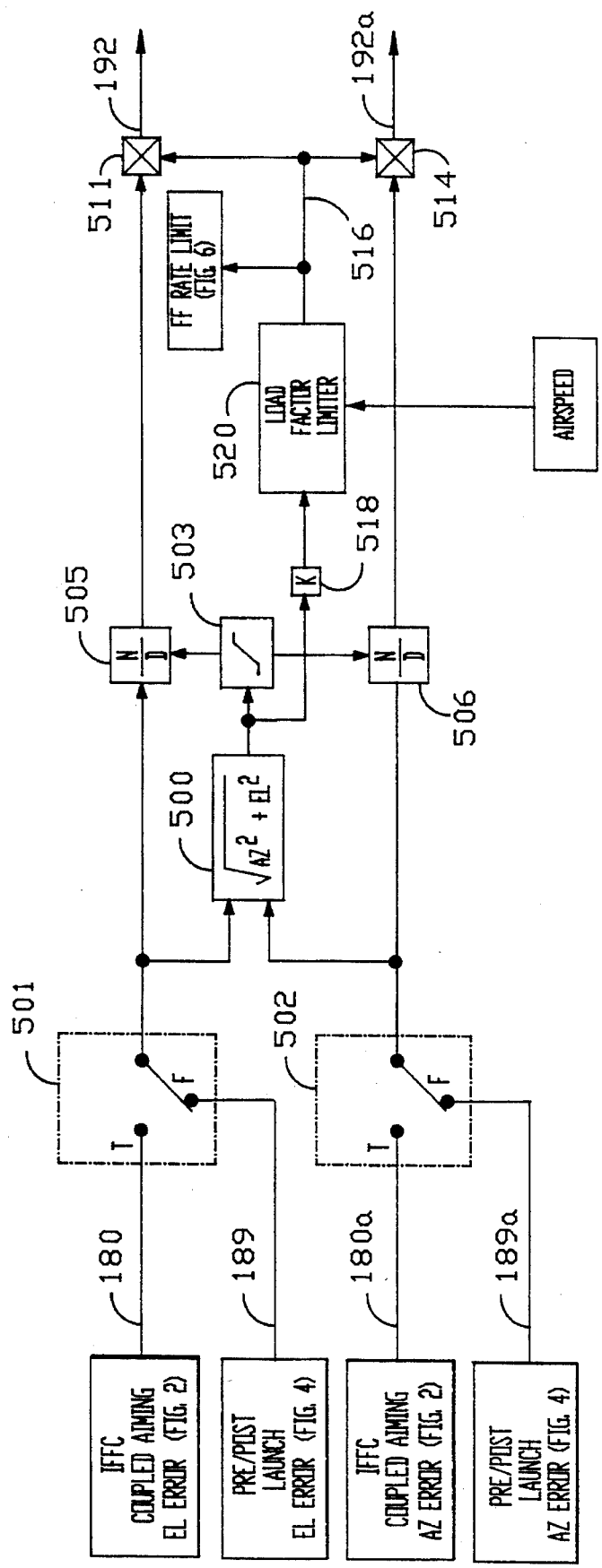
FIG. 5 is a schematic block diagram of a vector calculation portion of the integrated fire and flight control system of FIG. 2.

Referring now to FIG. 5, the pre-launch pitch attitude error signal is provided on the line 189 to a vector function 500 via a switch 501. The other input to the vector function is a pre-launch yaw attitude error signal provided on a line 189a via a switch 502. The vector function 500 resolves the pre-launch pitch attitude error signal and the pre-launch yaw attitude error signal into a magnitude vector using equation 1 below:

$$\text{Attitude Magnitude Vector Signal} = \sqrt{Az^2 + El^2}$$

where:
  $Az$ = the pre-launch pitch attitude error signal; and (eq. 1)
  $El$ = the pre-launch yaw attitude error signal.

The output of the vector function 500 is an attitude error signal which is indicative of the magnitude of a vector formed by the pre-launch pitch attitude error signal and the pre-launch yaw attitude error signal. The attitude error signal is provided to a limit function 503. The limit function limits the minimum magnitude of the attitude error signal to prevent division by zero in division functions 505 and 506. The output of the limit function 503 is provided to division functions 505 and 506 as the denominator, the numerator being the pre-launch pitch attitude error signal and the pre-launch yaw attitude error signal, respectively. The output of the division function 505 is a signal indicative of the direction and fraction of the attitude error signal in the pitch (elevation) direction, and is provided on a line 510 to a multiplication function 511. Similarly, the output of the division function 506 is the direction and fraction of the attitude error signal in the yaw (azimuth) direction and is provided on a line 513 to a multiplication function 514. The other input to the multiplication functions 511 and 514 is a load factor limit signal on a line 516, provided by a load factor limit function 520. The load factor limit function 520 is responsive to the attitude error signal provided via a gain function 518. The gain function converts the error magnitude into an aircraft body rate command. The load factor limit function 520 is also responsive to the velocity signal on the line 184 (from a velocity sensor 31) for providing the load factor limit signal on the line 51 6. The magnitude of the load factor limit signal is determined to prevent the aircraft from exceeding a certain load factor, e.g., 0.5 g's. The output of the multiplication function 511 is a pitch rate command signal on a line 192. Similarly, the output of the multiplication function 514 is a yaw rate command signal on a line 192a.

Figure 6:
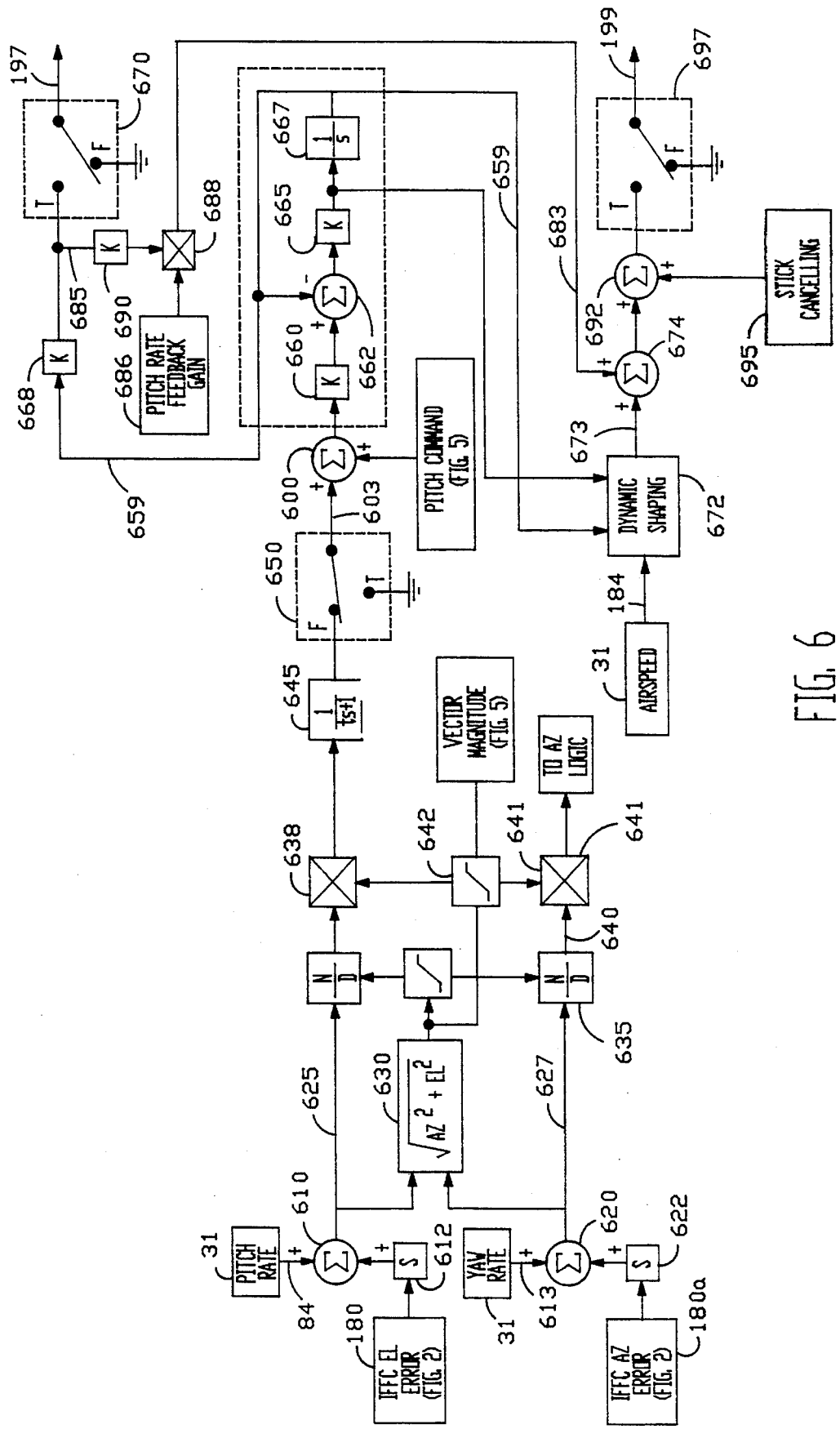
FIG. 6 is a schematic block diagram of a desired response and dynamic shaping portion of the integrated fire and flight control system of FIG. 2.

Referring now to FIG. 6, the pitch rate command signal is provided on the line 192 to a summing junction 600. The other input to the summing junction 600 is an elevation component of an aiming rate feedforward vector on a line 603. The aiming rate feedforward vector is the vector defined by rate of change of the aiming line of sight in space, measured in the aircraft body axis frame of reference. To determine the aiming error rate feedforward vector, the rate of change of the aiming line of sight must first be determined. The pitch rate signal on the line 84 (from sensors 31) and an IFFC elevation rate signal on a line 605 are applied to a summing junction 610. This approximates the rate of change of the aiming line of sight for small angles. The elevation rate signal can be determined by applying the IFFC elevation error signal on a line 180 to a derivative function 612. Alternatively, the rate signal can be obtained directly from the tracking system. For larger angles, a more complex axis transformation could be used. The output of the summing junction 610 is the elevation component of an aiming rate feedforward signal. The pitch rate signal on the line 84 is indicative of the rate of change of the aircraft relative to the earth, and the IFFC elevation rate signal on the line 605 is indicative of the aiming rate relative to the airframe. Therefore, the output of the summing junction 610 is a track angle rate of change which is indicative of the rate of change of aircraft attitude to track on the target once the aircraft is pointing at the target.

A yaw rate signal on a line 613 (from sensors 31) and an IFFC azimuth rate signal on a line 615 are applied to a summing junction 620. The IFFC azimuth rate signal is determined by applying the IFFC azimuth error signal on a line 180a to a derivative function 622. The output of the summing junction 620 is the azimuth component of the aiming rate feedforward signal. As will be understood by those skilled in the art, the azimuth and elevation components of the aiming rate feedforward signal may be provided directly by the fire control tracking system.

The IFFC elevation rate signal is provided on a line 625 to a vector magnitude function 630. The other input to the vector magnitude function 630 is the IFFC azimuth rate signal on a line 627. The vector magnitude function 630 gives the combined IFFC rate signal magnitude using equation 1 above. The output of the vector function 630 is the aiming rate feedforward signal which is provided to a limit function 632. The limit function limits the minimum magnitude of the aiming rate feedforward signal to prevent division by zero in division functions 634 and 635. The output of the limit function 632 is provided to division functions 634 and 635 as the denominator, the numerator being the IFFC elevation rate signal and IFFC azimuth rate signal, respectively. The output of the division function 634 is a signal indicative of the direction and fraction of the aiming rate feedforward signal in the elevation direction, and is provided on a line 637 to a multiplication function 638. Similarly, the output of the division function 635 is the direction and fraction of the aiming rate feedforward signal in the azimuth direction, and is provided on a line 640 to a multiplication function 641. The other input to the multiplication functions 638 and 640 is a variable load factor limit signal provided by a limit function 642. The load factor limit signal is based on the output of the load factor limit function 520 (FIG. 5) and the magnitude of the aiming rate feedforward signal. The multiplication functions 638, 640 are provided to prevent the aircraft from exceeding a load factor limit, e.g., 0.5 g's, in response to the combination of the rate feedforward command with the commanded rate to change the aircraft attitude in the pre-launch and launch phases of the maneuver.

The output of the multiplication function 638 is provided via a lag filter 645, a gain function 648, and a switch 650 to provide the elevation component of the limited aiming rate feedforward signal on the line 603. The lag filter 615 acts a smoothing filter to prevent the high frequency part of the track angle rate signal from upsetting the aircraft response.

The output of the summing junction 600 is the total IFFC rate command on a line 655 and is applied to a desired response function 658. The desired response function 658 is similar to the PFCS desired response function 72a (FIG. 2), except that the time constant is shorter. The output of the IFFC desired response function 658 is the IFFC commanded elevation rate signal on a line 659. The desired response function includes a constant 660 which provides a sign change, a summing junction 662 which provides a desired response function internal feedback path, a gain function 665 which provides the desired response function band width, and an integrator 667. The IFFC commanded elevation rate signal is provided on the line 659 to the line 197 via a gain function 668 which provides a sign change, and a switch 670. The operation of the switch 670 will described in greater detail hereinafter with respect to FIG. 7. The IFFC commanded elevation rate signal is also provided on the line 659 to an IFFC dynamic shaping function 672.

The IFFC dynamic shaping function 672 provides a feedforward elevation command signal on a line 673 to a summing junction 674. The operation of the IFFC dynamic shaping function 672 is substantially identical to the operation of the PFCS dynamic shaping function 72b (FIG. 2) resulting in the feedforward command signal being indicative of a stick input corresponding to a desired rotor response. The dynamic shaping function 672 is responsive to the IFFC commanded elevation rate signal on the line 659, the output of the gain function 665 on a line 680, and an airspeed signal on the line 184 from sensors 31 for providing the feedforward elevation command signal on the line 673. The dynamic shaping function is modified as a function of airspeed to approximate the plant changes that result from changes in airspeed, to thereby provide a resulting signal the magnitude of which is in terms of inches of stick (like the PFCS feedforward command signal).

The feedforward elevation command signal is provided to the summing junction 674, the other input of which is a PFCS pitch rate canceling signal on a line 683. The rate canceling signal is determined by multiplying the IFFC commanded elevation rate signal on a line 685 by a pitch rate feedback gain (provided by a pitch rate feedback gain function 196) in a multiplication function 688. The gain function 690 provides a sign change so that the result offsets, the feedback damping of the PFCS.

The output of the summing junction 674 is provided to a summing junction 692, the other input of which is a stick canceling signal provided by a stick canceling function 695. The stick canceling function 695 makes the IFFC less responsive to small stick inputs during operation in the coupled aiming mode, to prevent inadvertent and small stick inputs from altering the aircraft heading from the commanded pre-launch and post-launch maneuvers. The stick canceling function is in no way intended to degrade authority of intentional pilot stick inputs. It merely cancels out small, inadvertent signals that would degrade the firing attitude. The operation of the stick canceling function is described in greater detail in commonly owned, co-pending U.S. patent application Ser. No. 07/885,702 entitled "Helicopter Integrated Fire and Flight Control Having Azimuth and Pitch Control", the disclosure of which is incorporated herein by reference.

The output of the summing junction 692 is the IFFC feedforward elevation command signal which is provided to the line 199 via a switch 697. The operation of the switch 697 will described in greater detail hereinafter with respect to FIG. 7.

II. PITCH-UP MANEUVER PHASE

Referring again to FIG. 4, once the aircraft has achieved the desired pre-launch velocity to counteract the aiming and firing maneuver, the aircraft is no longer required to accelerate, and it may begin it's pitch up to the aiming pitch attitude. Therefore, the switch 415 is activated such that an initial aiming attitude error signal on a line 440 replaces the fixed acceleration error signal for providing the attitude reference. The initial aiming attitude signal is determined when the initial ballistic solution is calculated upon activation of the coupled aiming/programmed area bombing mode. As described hereinbefore with respect to FIG. 2, upon activation of the coupled aiming mode, the fire control system 55 calculates an IFFC elevation error signal which is indicative of the change in aircraft attitude required to satisfy an aiming solution. The IFFC elevation error signal is provided on the line 180 to a data storage device 443 where the initial value is stored and provided on a line 445 to a summing junction 448. The aircraft pitch attitude signal is provided on the line 107 to a data storage device 450 where the initial pitch attitude is stored and provided on a line 452 to the summing junction 448. Additionally, the current aircraft pitch attitude is provided on the line 107 to the summing junction 448. Therefore, once the aircraft achieves the velocity required to counteract the pitch up and firing maneuver, the switch 415 is activated, and the initial aiming attitude error signal on the line 440 is provided to the attitude reference loop containing the integrator 425. The aiming attitude error signal drives the integrator 425 to the stored aiming attitude. Therefore, the output of the summing junction 420 is an attitude error command. The aiming attitude error signal causes the aircraft to begin it's pitch up to the required aiming attitude without the need for actual fire control solution data. This allows the control to operate immune for fire control solution faults until the aircraft attitude is within a threshold magnitude of the firing solution.

III. AIMING AND WEAPONS-LAUNCH MANEUVER PHASE

As described in commonly owned U.S. Pat. No. 5,238,203, entitled "High Speed Turn Coordination For A Rotary Wing Aircraft" and in commonly owned co-pending U.S. patent application Ser. No. 07/967,308 entitled "Helicopter Integrated Fire and Flight Control Having Coordinated Area Bombing Control", the disclosures of which are incorporated herein by reference, aircraft attitude must be within a threshold magnitude of the firing solution for the IFFC system to control aircraft attitude. In the present application, the pitch-up maneuver is performed until aircraft attitude is sufficiently close to the firing solution.

Referring now to FIG. 5, once the aircraft begins to assume the proper aiming attitude, i.e., aircraft attitude is within a threshold magnitude of the firing solution, the current fire control solution may be used to provide the attitude reference for the firing of weapons. As described in greater detail with respect to FIG. 7, when the threshold magnitude is satisfied, switches 501 and 502 (FIG. 5) are activated so that the IFFC elevation and azimuth error signals on the lines 180 and 180a provide the attitude reference to the vector function for computing the aircraft firing attitude. The transition from using a fixed acceleration error signal, to the initial firing attitude error signal, and then ultimately to the current firing attitude is intended to make the pre-launch and pitch-up maneuvers to the firing attitude as accurate and rapid as possible while minimizing unwanted variations in the aircraft attitude.

Once the aircraft attitude satisfies the firing solution, the pilot may fire the weapons, or the aircraft weapons may be automatically released, as described in commonly owned co-pending U.S. patent application Ser. No. 07/967,308 entitled "Helicopter Integrated Fire and Flight Control Having Coordinated Area Bombing Control", the disclosure of which is incorporated herein by reference.

IV. POST-LAUNCH RECOVERY MANEUVER PHASE

At the completion of weapons firing, the system enters a postlaunch mode, and the switches 501 and 502 (FIG. 5) are deactivated so that a post-launch attitude reference may be provided by the system. In accordance with the present invention there are four possible post-launch maneuver phase recovery modes which the aircraft may assume: attitude recovery, velocity recovery, hover-hold recovery and position recovery. The default recovery mode is the attitude recovery mode wherein the aircraft assumes the attitude prior to activation of the programmed area bombing mode. However, if the aircraft was in a velocity hold mode, e.g., a fixed velocity condition, prior to activation of the IFFC programmed area bombing mode, the aircraft will assume the velocity recovery mode. A sub-set of the velocity hold mode is the hover-hold mode wherein the aircraft returns to a hover if it was in a hover-hold mode prior to commencement of the maneuver. Finally, if the aircraft was in the hover-hold mode, and had established a reference position prior to activation of the IFFC programmed area bombing mode, then the aircraft will assume the position recovery mode. In the position recovery mode, the aircraft will assume a hover attitude at the reference position.

If the system enters the attitude recovery mode, the switch 433 is activated, and an attitude recovery error signal is provided on a line 460 to the line 189 via the switch 433. The attitude recovery error signal is determined as the difference between the initial aircraft attitude on the line 452, which was the aircraft attitude upon initiation of the IFFC coupled aiming mode, and the current aircraft attitude on the line 107, the difference being determined by the summing junction 463. The output of the summing junction is provided to the line 460.

In the velocity recovery mode, a velocity recovery error signal is provided on a line 470 to the summing junction 405 via a limiter 472 and a switch 400. The velocity recovery error signal is indicative of the difference between aircraft velocity upon activation of the coupled aiming mode and the aircraft's current velocity. Aircraft velocity is provided on the line 184 to a summing junction 475. Additionally, aircraft velocity is provided on the line 184 to a data storage device 477. The data storage device 477 stores the initial aircraft velocity upon activation of the coupled aiming mode. The output of the data storage device 477 is the initial velocity on a line 479 which is provided to the is summing junction 475 via a switch 481. The switch 481 is activated in the velocity recovery mode. The output of the summing junction 475 is the difference between the aircraft's current velocity and the initial velocity and is provided to a summing junction 483 via a gain function 485. During operation in the velocity recovery mode, there is no other input to the summing junction 483.

The hover-hold recovery mode uses the same signal path as the velocity recovery mode except that the switch 481 remains deactivated so that a zero reference signal is used as the initial velocity input to the summing junction 475. Alternatively, the switch 481 may be activated in the hover-hold recovery mode, and the output of the data storage device 477 may be set to a zero velocity reference.

Finally, during operation in the position recovery mode, a position recovery error signal is provided on the line 470 via the summing junction 483. The velocity signal on the line 184 is provided to an integral function 487, the output of which is a position signal which is the change in position since the IFFC was engaged. The integrator 487 is set equal to zero when IFFC is off. Once IFFC is activated, the output of the integrator 487 is a value equal to the position change signal (position error) which is provided via a gain function 490, a limiter 492 and a switch 495 to the summing junction 483. The position error is brought to zero by the position recovery loop during operation in the position recovery mode of the post-launch maneuver phase. The other input to the summing junction 483 is the velocity signal via the summing junction 475 and gain function 485. The velocity reference is zero due to the switch 481 being deactivated. The zero velocity reference provides damping to the position control loop. The same function exists in the roll channel except that the position and/or velocity recovery must account for axis transformation.

V. SWITCH CONTROL LOGIC

FIG. 7 illustrates the logic required to control the switches of FIGS. 4, 5 and 6. As will be apparent to those skilled in the art, various logic may be used for the control of the switches in FIGS. 4, 5 and 6, and the logic of FIG. 7 is only exemplary of that which may be used for the switch control.

Referring to FIG. 7, an AND gate 700 is responsive to three input signals for providing a signal to the set terminal of a latch 702. The latch 702 is set when the following three signals are present: IFFC is on, a ballistic weapon, e.g., missile, is selected for firing, and a pre-launch maneuver has been requested. As described in commonly owned copending U.S. patent application Ser. No. 07/967,308 entitled "Helicopter Integrated Fire and Flight Control Having Coordinated Area Bombing Control", IFFC may be activated by the pilot depressing a switch or button on the side arm controller 29 (FIG. 1), or a more sophisticated control may be provided. For example, the IFFC may be activated in response to pilot activation of the button on the sidearm controller, and the fire control system being activated and providing valid fire control signals. Additionally, coordinated area bombing in conjunction with IFFC may be activated only when certain weapons are selected of the type having coordinated area bombing control, e.g., ballistic weapons and missiles. A ballistic weapons request and a pre-launch maneuver request may be selected by pilot activation of IFFC mode selection switches on a fire control panel or other suitable method for configuring a fire control system. When the latch 702 is set, switches 670 and 679 (FIG. 6) are activated such that IFFC signals are provided on the lines 197 and 199 respectively. When IFFC is deactivated, the latch is re-set, and the switches 670 and 679 are de-activated.

Figure 8:
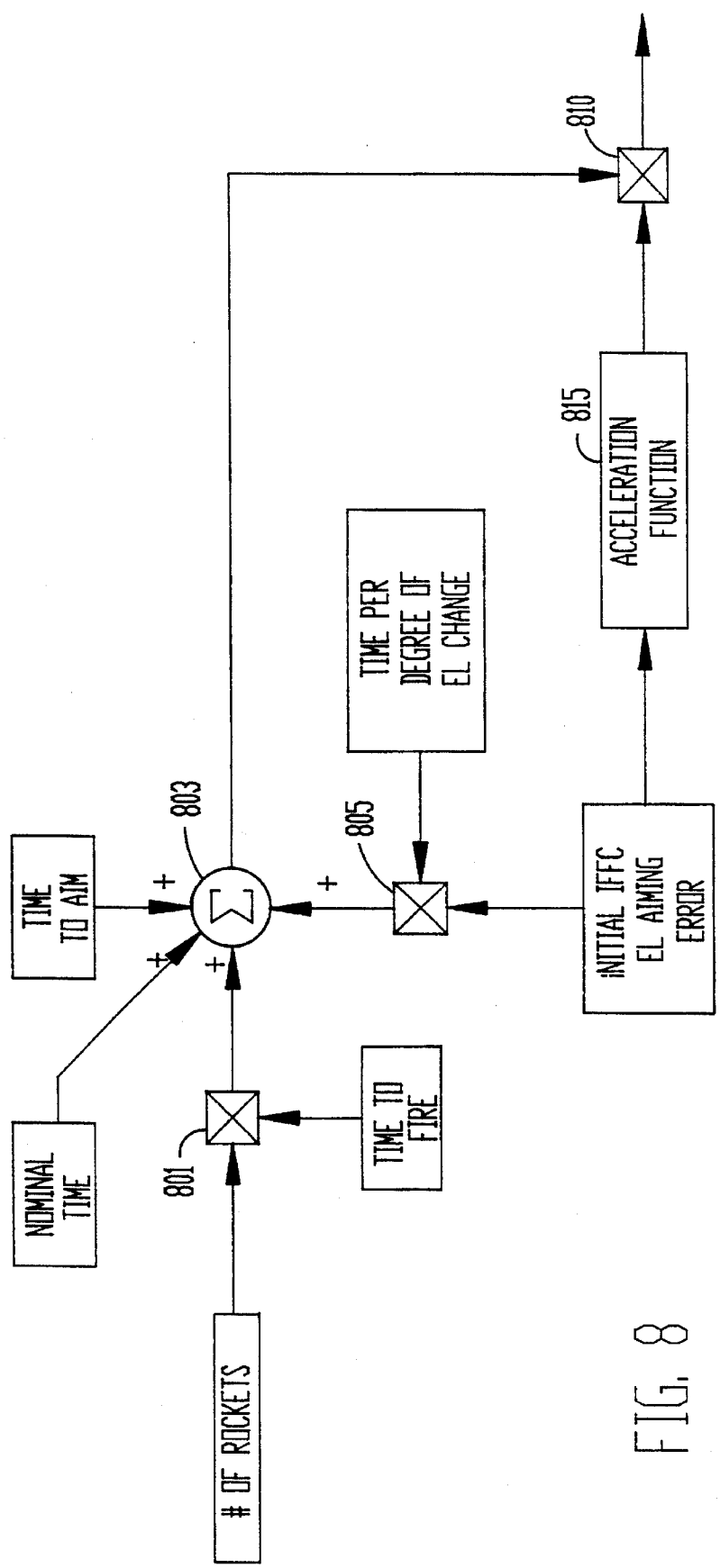
FIG. 8 is a schematic block diagram of a pre-launch velocity calculation portion of the integrated fire and flight control system of FIG. 2.

The latch 702 is reset when the IFFC is turned off. This is illustrated in FIG. 7 by providing a NOT gate 705 between the IFFC "ON" signal line and the reset terminal of the latch 702. The output of the latch 702 is an IFFC pre-launch request signal which is provided as one input to an AND gate 710. The other input to the AND gate 710 is a logic signal which indicates that aircraft velocity is greater than the pre-launch velocity required during the pre-launch maneuver. An example of the logic which determines the required pre-launch velocity is illustrated in FIG. 8, and will be described in greater detail hereinafter with respect to FIG. 8. Therefore, when the IFFC pre-launch request signal is present, and aircraft velocity is greater than the required pre-launch velocity, the AND gate 710 will provide an output signal to the set terminal of a latch 712. The output of the latch 712 is an IFFC pre-launch velocity signal which indicates that the aircraft has achieved the required pre-launch velocity. The latch 712 is reset when IFFC is deactivated. A NOT gate 715 is provided on the output of the latch 712 such that prior to the aircraft achieving the required pre-launch velocity, there is no output from the latch 712 and the output of the NOT gate 715 is a logic high which is provided to activate the switch 400 (FIG. 4) for the acceleration phase of the pre-launch maneuver. Once the aircraft achieves the required pre-launch velocity, the pre-launch velocity signal will be provided on the output of the latch 712, the output of the NOT gate 715 will be a logic low, and the switch 400 will be deactivated.

As described herein with respect to the pitch-up maneuver phase, at the completion of the acceleration phase there may be a large difference between actual aircraft attitude and the aircraft attitude required to launch weapons. Therefore, an initial pitch-up maneuver is provided. The pitch-up maneuver is provided until the magnitude of the elevation error is below a constraint limit, e.g., a threshold magnitude. When the elevation error is less than the constraint limit, a signal is provided as one input to an AND gate 718. The other input to the AND gate 718 is the IFFC pre-launch velocity signal. The output of the AND gate 718 is provided to the set terminal of a latch 720. The latch 720 is reset upon deactivation of the IFFC. The output of the latch 720 is an aiming signal which indicates that the pre-launch acceleration maneuver is complete and the elevation error is less than the constraint limit. A NOT gate 723 is provided on the output of the latch 720, the output of the NOT gate 723 being provided to an AND gate 725. Therefore, the output of the NOT gate 723 will be a logic high when the elevation error is greater than the elevation error constraint limit. The other input to the AND gate 725 is the IFFC pre-launch velocity signal from the latch 712. The output of the AND gate 725 is provided to control the switch 415 (FIG. 4). Therefore, the switch 415 will be activated once the aircraft has reached the required pre-launch velocity and the elevation error is greater than the elevation error constraint limit. Once the elevation error is less than the constraint limit, the output of the NOT gate 723 will be a logic low, and the switch 415 is deactivated The switches 501 and 502 (FIG. 5) are only activated during the aiming and weapons launch maneuver phase. A latch 730 is set when all weapons have been fired and is reset when IFFC is deactivated. Therefore, the output of the latch 730 indicates that the firing phase of the maneuver has been completed. A NOT gate 734 is provided on the output of the latch 730 and will provide as an output a logic high prior to the release of all the weapons. The output of the NOT gate 734 is provided to an AND gate 737. The other inputs to the AND gate 737 are the aiming signal and the IFFC pre-launch velocity signal. The output of the AND gate 737 is provided to control the switches 501 and 502. Therefore, the switches 501 and 502 will only be activated when the pre-launch velocity signal is present indicating that aircraft velocity had achieved the required pre-launch velocity, the aiming signal is present indicating that the attitude error is less than the constraint limit, and not all of the weapons have been fired.

The switch 650 (FIG. 6) is activated during the pre-launch and post-launch maneuver phases. The IFFC pre-launch velocity signal and the output of the NOT gate 734 are provided as the inputs to an AND gate 740. The output of the AND gate 740 is provided via a NOT gate 742 for controlling the switch 650. When the IFFC pre-launch velocity signal is not present (during the pre-launch maneuver, the output of the AND gate 740 is logic low, and the output of the NOT gate 742 is logic high, and therefore the switch 650 is activated. When the IFFC pre-launch velocity signal is present indicating that the pre-launch maneuver was completed, and the output of the NOT gate 734 is high indicating that all weapons have not yet been fired, the output of the AND gate 740 will be logic high, and the output of the NOT gate will be logic low, and the switch 650 will be deactivated. Once all the weapons have been fired, the output of the NOT gate 734 will be a logic low, and the switch 650 will again be activated.

Once all the weapons have been fired, the post-launch recovery maneuver phase is performed. As described herein before, the mode of the post-launch recovery phase is determined based on the condition of the aircraft flight control system prior to the IFFC coordinated area bombing sequence. The IFFC first checks in a test 745 if the aircraft was in the velocity hold mode. If the results of the test 745 are negative, then a signal is provided to the set terminal of a latch 748 indicating that the attitude recovery mode has been selected. The latch 748 is reset when IFFC is deactivated. The output of the latch 748 is provided to an AND gate 750. The other input to the AND gate 750 is the output of the latch 730 indicating that all weapons have been fired. The output of the AND gate 750 is an attitude recovery mode signal provided to activate the switch 433. The attitude recovery mode signal is also provided as an input to an AND gate 752. The other inputs to the AND gate 752 are signals indicative of when the pitch attitude error signal and the pitch rate error signal are both below respective threshold magnitudes indicating that the aircraft has achieved the desired attitude.

If the results of the test 745 are positive, a test 755 is performed wherein the IFFC checks if the hover hold mode was selected. If the results of the test 755 are negative, a signal is provided to the set terminal of a latch 758 indicating that the velocity hold recovery mode has been selected. The latch 758 is reset when IFFC is deactivated. The output of the latch 758 is provided to an AND gate 760. The other input to the AND gate 760 is the output of the latch 730 indicating that all weapons have been fired. The output of the AND gate 760 is an velocity hold recovery mode signal provided to activate the switch 481. The velocity hold recovery mode signal is also provided as an input to an AND gate 762. The other inputs to the AND gate 762 are signals indicative of when a pitch attitude error signal, a velocity error signal, and an acceleration error signal are all below respective threshold magnitudes indicating that the aircraft has achieved the desired velocity hold condition.

If the results of the test 755 are positive, a test 765 is performed wherein the IFFC checks if a reference position was established in conjunction with the hover hold mode. If the results of the test 765 are negative, a signal is provided to the set terminal of a latch 768 indicating that the hover hold recovery mode has been selected. The latch 768 is reset when IFFC is deactivated. The output of the latch 768 is provided to an AND gate 770. The other input to the AND gate 770 is the output of the latch 730 indicating that all weapons have been fired. The output of the AND gate 770 is a hover hold recovery mode signal wherein the switch 481 remains deactivated sot that a zero velocity reference is provided during the hover hold recovery mode. The hover hold recovery mode signal is also provided as an input to an AN D gate 772. The other is inputs to the AND gate 772 are signals indicative of when the pitch attitude error signal, the velocity error signal, and the acceleration error signal are all below respective threshold magnitudes indicating that the aircraft has achieved the desired hover hold condition.

If the results of the test 765 are positive, a signal is provided to the set terminal of a latch 778 indicating that the position recovery mode has been selected. The latch 778 is reset when IFFC is deactivated. The output of the latch 778 is provided to an AND gate 780. The other input to the AND gate 780 is the output of the latch 730 indicating that all weapons have been fired. The output of the AND gate 780 is a position recovery mode signal provided to activate the switch 495. The position recovery mode signal is also provided as an input to an AND gate 782. The other inputs to the AND gate 782 are signals indicative of when the velocity error signal and the position error signal are below respective threshold magnitudes indicating that the aircraft has achieved the desired hover hold attitude at the reference position.

At the completion of the selected post-launch recovery maneuver, IFFC is deactivated. The output of each of the AND gates 752, 762, 772 and 782 are provided as inputs to an OR gate 785. The output of the OR gate 785 is provided to an AND gate 788 via an OR gate 791. The output of the OR gate 785 will be logic low until the post-launch recovery maneuver is completed. The other input to the OR gate 791 is a signal indicating that the pilot has input a command above a threshold magnitude, indicating that the pilot is attempting to fly out of the post-launch recovery maneuver. The other input to the AND gate 788 is the output of the latch 730, indicating that all weapons have been fired, via a delay function 792. Prior to the firing of all the weapons, the output of the delay 792 will be a logic low, and the output of the AND gate 788 will be a logic low. Once all weapons have been fired, and at the expiration of the delay period, the output of the delay 792 will be a logic high. However, the output of the NOT gate 790 will be a logic low while the post-launch recovery maneuver is being performed. At the completion of the post-launch recovery maneuver, the output of the OR gate 785 is a logic high, and therefore, the output of the AND gate 788 will be a logic high deactivating IFFC.

As described herein before, IFFC may also be deactivated by the pilot releasing the switch on the sidearm controller. Additionally, IFFC may be deactivated if the pilot inputs a stick command above a threshold magnitude indicating that the pilot wants to fly out of the IFFC maneuver. As will be understood by those skilled in the art, additional logic may be provided for entry into the post-launch maneuver, such as the weapons launch not commencing within a specified time period, or the aircraft achieving a certain rearward acceleration during the aiming phase of the maneuver.

V. PRE-LAUNCH MANEUVER PHASE VELOCITY DETERMINATION

FIG. 8 illustrates a simple calculation which may be used to determine the velocity which the aircraft must achieve during the pre-launch maneuver to counteract the rearward acceleration which the aircraft will experience during the pitch-up, aiming and weapons launch maneuver phases. The simplified calculation determines the approximate amount of time that the aircraft attitude will be in the pitch-up and aiming attitude, and uses the firing solution elevation command to compute an approximate rearward acceleration which the aircraft will experience. The time and the acceleration calculations are thereafter used to compute the desired velocity.

Referring to FIG. 8, signals indicative of the number of rockets to be fired and the time to fire each rocket are provided to a multiplication function 801, the output of which is a firing time signal which is indicative of the time required to fire the rockets. The firing time signal is provided to a summing junction 803. The firing elevation command signal and a signal indicative of the time change per degree of elevation change are provided to a multiplication function 805. The output of the multiplication function 805 is provided to the summing junction 803 and is a signal indicative of the time it will take the aircraft to change from its current attitude to the firing attitude. Another input to the summing junction 803 is an arbitrary minimum or "nominal" time which accounts for pilot response time and provides a margin of error. The final input to the summing junction 803 is a signal which is indicative of the estimated time required for the aircraft to aim at the firing solution.

The output of the summing junction 803 is the total time approximation used to estimate the velocity loss or deceleration during aim and weapons launch. The output of the summing junction 803 is provided to a multiplication function 810, and is indicative of the estimated time required for the aircraft to pitch-up, aim, and fire weapons. The other input to the multiplication function 810 is the firing elevation command signal which is provided via an acceleration function 815. The acceleration function 815 computes an estimated rearward acceleration corresponding to the elevation signal. The output of the multiplication function 810 is the IFFC pre-launch velocity signal which is the signal indicative of the desired velocity to be achieved during the pre-launch maneuver.

Although the invention has been described and illustrated with respect to exemplary embodiments thereof, it should be understood by those skilled in the art that the foregoing and various other changes, omissions and additions may be made therein and thereto without departing from the spirit and scope of the present invention

We claim:

1. A helicopter flight control system for providing control surface command signals to helicopter control surfaces thereby controlling the yaw, pitch, roll and lift attitude axes of the helicopter in flight, comprising:

means for providing a target position signal indicative of a target position with respect to the helicopter;

means for providing a ballistic trajectory signal indicative of the required helicopter launch attitude for a projectile launched by the helicopter to hit said target position; and pre-launch director means for providing a pre-launch maneuver signal indicative of helicopter attitude prior to assuming said launch attitude to counteract for the changes in position of the helicopter caused by the helicopter assuming said launch attitude.

2. A helicopter flight control system according to claim 1 further comprising:

coupled aiming mode indicating means for providing a coupled aiming signal in response to activation of a flight control system coupled aiming mode;

display means for providing a helicopter pilot with said pre-launch maneuver signal in response to said coupled aiming signal; and signal processing means responsive to the presence of said coupled aiming signal and the completion of said pre-launch maneuver for providing control surface command signals to change helicopter attitude to said launch attitude.

3. A helicopter flight control system according to claim 1 further comprising:

coupled aiming mode indicating means for providing a coupled aiming signal in response to activation of a flight control system coupled aiming mode; and signal processing means responsive to the presence of said coupled aiming signal for providing control surface command signals to change helicopter attitude to perform said pre-launch maneuver and thereafter assume said launch attitude.

4. A helicopter flight control system according to claim 3 further comprising:

memory means for storing a pre-launch state signal indicative of helicopter state prior to activation of said coupled aiming mode; and said signal processing means providing control surface command signals to return helicopter state to said pre-launch state after a weapons launch from said launch attitude.

5. A helicopter integrated fire and flight control system for providing control surface command signals to helicopter control surfaces for controlling the yaw, pitch, roll and lift attitude axes of the helicopter in flight, comprising:

fire control means for providing a target position signal indicative of a target position with respect to the helicopter;

means for providing a ballistic trajectory signal indicative of the required aircraft launch attitude for a projectile launched by the helicopter to hit said target position;

means for providing a launch maneuver signal indicative of the time required for the helicopter to aim and release said projectiles; and pre-launch maneuver means responsive to said ballistic trajectory signal and said launch maneuver signal for providing a pre-launch maneuver signal indicative of a pre-launch maneuver forward acceleration and velocity profile required to make a symmetrical maneuver sequence that will be canceled by the subsequent deceleration and velocity loss during the pitch up maneuver to the ballistic firing solution.

6. A helicopter integrated fire and flight control system according to claim 5 further comprising means for displaying said forward acceleration and velocity profile to a pilot.

7. A helicopter integrated fire and flight control system according to claim 5 further comprising signal processing means responsive to said pre-launch maneuver signal for providing control surface command signals to change helicopter attitude to perform said pre-launch maneuver.

8. A helicopter integrated fire and flight control system according to claim 7 further comprising:

post-launch maneuver memory means for storing a helicopter state signal indicative of the pre-launch state of said helicopter prior to the performance of said pre-launch maneuver; and said signal processing means being responsive to the launch of said projectiles for providing control surface command signals to return the helicopter to said pre-launch state.

9. A helicopter integrated fire and flight control system according to claim 8 wherein said signal processing means is further responsive to said ballistic trajectory signal for providing control surface command signals to change helicopter attitude to said launch attitude after the completion of said pre-launch maneuver.

* * * * *